(12) United States Patent
Su

(10) Patent No.: US 7,695,822 B2
(45) Date of Patent: Apr. 13, 2010

(54) TIE-LAYER FOR POLYOLEFIN FILMS

(75) Inventor: Tien-Kuei Su, Saunderstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 989 days.

(21) Appl. No.: 11/416,385

(22) Filed: May 3, 2006

(65) Prior Publication Data

US 2006/0257652 A1 Nov. 16, 2006

Related U.S. Application Data

(60) Provisional application No. 60/679,251, filed on May 10, 2005.

(51) Int. Cl.
*B32B 27/08* (2006.01)
*B32B 27/06* (2006.01)
*B32B 27/28* (2006.01)
*B32B 27/30* (2006.01)
*B32B 27/32* (2006.01)

(52) U.S. Cl. .................. 428/515; 428/500; 428/516

(58) Field of Classification Search .......... 428/500, 428/515, 516
See application file for complete search history.

(56) References Cited

U.S. PATENT DOCUMENTS

| | | |
|---|---|---|
| 3,639,134 A | 2/1972 | Stegmeier et al. |
| 4,650,721 A | 3/1987 | Ashcraft et al. |
| 4,725,466 A | 2/1988 | Crass et al. |
| 4,828,915 A | 5/1989 | Schroeder et al. |
| 4,956,232 A | 9/1990 | Balloni et al. |
| 4,997,700 A | 3/1991 | Bothe et al. |
| 5,049,423 A | 9/1991 | German, Jr. |
| 5,069,946 A | 12/1991 | Moritani et al. |
| 5,108,844 A | 4/1992 | Blemberg et al. |
| 5,126,401 A | 6/1992 | Chou |
| 5,141,801 A | 8/1992 | Takeshita et al. |
| 5,153,074 A | 10/1992 | Migliorini |
| 5,175,054 A | 12/1992 | Chu |
| 5,208,082 A | 5/1993 | Chou |
| 5,275,853 A | 1/1994 | Silvis |
| 5,286,575 A | 2/1994 | Chou |
| 5,376,437 A | 12/1994 | Kawakami et al. |
| 5,464,924 A | 11/1995 | Silvis et al. |
| 5,472,753 A | 12/1995 | Farha |
| 5,474,820 A | 12/1995 | Murschall et al. |
| 5,491,023 A | 2/1996 | Tsai et al. |
| 5,500,282 A | 3/1996 | Heffelfinger et al. |
| 5,512,649 A | 4/1996 | Hendrickson-Benkhoff et al. |
| 5,667,902 A | 9/1997 | Brew et al. |
| 5,688,556 A | 11/1997 | Wagner, Jr. |
| 5,877,257 A | 3/1999 | Fetell |
| 5,962,093 A | 10/1999 | White et al. |
| 5,993,977 A | 11/1999 | Laiho et al. |
| 5,997,679 A | 12/1999 | Wheat et al. |
| 6,011,115 A | 1/2000 | Miharu et al. |
| 6,033,514 A | 3/2000 | Davis et al. |
| 6,033,771 A | 3/2000 | Heffelfinger |
| 6,087,020 A | 7/2000 | Vandekerckhove et al. |
| 6,106,933 A | 8/2000 | Nagai et al. |
| 6,106,982 A | 8/2000 | Mientus et al. |
| 6,109,006 A | 8/2000 | Hutchinson |
| 6,146,574 A | 11/2000 | Henkee |
| 6,180,715 B1 | 1/2001 | Schmidt |
| 6,211,290 B1 | 4/2001 | Xiao et al. |
| 6,326,068 B1 | 12/2001 | Kong et al. |
| 6,376,583 B1 | 4/2002 | Winkler et al. |
| 6,495,266 B1 | 12/2002 | Migliorini |
| 6,503,611 B1 | 1/2003 | Chang et al. |
| 6,503,635 B1 | 1/2003 | Kong et al. |
| 6,589,621 B1 | 7/2003 | Beckerdite |
| 6,641,913 B1 | 11/2003 | Hanyu et al. |
| 6,663,940 B1 | 12/2003 | Osame et al. |
| 6,703,134 B1 | 3/2004 | Parr et al. |
| 6,723,431 B2 | 4/2004 | Mallory et al. |
| 6,723,443 B2 | 4/2004 | Tsai et al. |
| 6,764,752 B2 | 7/2004 | Chang |
| 6,982,119 B2 | 1/2006 | Shi et al. |
| 7,163,727 B2 | 1/2007 | Su et al. |
| 2003/0198815 A1 | 10/2003 | Walker et al. |
| 2003/0220036 A1 | 11/2003 | Lee et al. |
| 2005/0089682 A1 | 4/2005 | Su et al. |
| 2005/0186414 A1 | 8/2005 | Su et al. |
| 2006/0233988 A1 | 10/2006 | Su |
| 2006/0269755 A1 * | 11/2006 | Song .................. 428/411.1 |
| 2007/0031653 A1 | 2/2007 | Su |
| 2007/0141372 A1 | 6/2007 | Su et al. |
| 2008/0014429 A1 | 1/2008 | Su et al. |
| 2008/0205800 A1 | 8/2008 | Su et al. |

FOREIGN PATENT DOCUMENTS

| | | |
|---|---|---|
| JP | 2000-248124 | 9/2000 |
| WO | WO-97/09380 A | 3/1997 |
| WO | WO-99/20673 | 4/1999 |
| WO | WO-02/45958 | 6/2002 |
| WO | WO-02/059177 | 8/2002 |

OTHER PUBLICATIONS

Major industrial polymers. (2009). In Encyclopædia Britannica. Retrieved Jul. 9, 2009, from Encyclopædia Britannica Online: http://www.britannica.com/EBchecked/topic/1426103/industrial-polymers.*

Lotader: Range of ethylene-acrylic ester-maleic anhydride, provided by Arkema (no date).*

Glass, T. et al. (2001). "Building BLOX®—New Thermoplastic Adhesive and Barrier Resins," Dow Chemical Company Technical Report.

(Continued)

Primary Examiner—Michael J Feely
(74) Attorney, Agent, or Firm—Morrison & Foerster LLP

(57) ABSTRACT

A laminate film including a first polyolefin layer comprising of a blend of 50-95% ethylene-propylene copolymer and 50-5% ethylene polar terpolymer with a polar polymer layer on one side of said first polyolefin resin-containing layer is disclosed. The laminate film could further have additional layers such as a second polyolefin resin-containing layer, a metal layer, or combinations thereof.

26 Claims, No Drawings

OTHER PUBLICATIONS

Schmitz, Peter et al. "Films." Ullman's Encyclopedia of Industrial Chemistry, 5th Ed., vol. A11 (1988), pp. 85-110.

Petrie, Edward. (2000) "Surfaces and Surface Preparation," Chapter 6 in Handbook of Adhesives and Sealants, McGraw-Hill, pp. 197-251.

Arkema, S.A. Product brochure titled "Lotader: Ethylene acrylate based terpolymers," located at http://www.arkema.com/sites/group/fr/common/advanced_search.page3result visited on Oct. 2, 2007. (2 pages).

Technical data sheets for Lotader(R) Grade 4503, dated Jul. 2005, retrieved on Jul. 6, 2007, located at www.lotader.com.

PCT International Search Report and Written Opinion mailed Aug. 10, 2007, directed to related PCT/US 06/17176.

International Search Report dated Jul. 30, 2007, directed to counterpart PCT application PCT/US06/29537; 1 page.

International Preliminary Report on Patentability, dated Nov. 13, 2007, directed to International Patent Application No. PCT/US2006/017176; 6 pages.

Supplementary European Search Report, mailed Mar. 26, 2008, directed to related Foreign Patent Application No. EP-0573735.4; 3 pages.

International Preliminary Report on Patentability mailed on Oct. 23, 2007 directed to International Patent Application No. PCT/US05/13116; 5 pages.

International Search Report mailed Feb. 15, 2006, directed to International Patent Application No. PCT/US05/13116; 8 pages.

International Search Report and Written Opinion, mailed Feb. 11, 2005, directed to related International Patent Application No. PCT/US04/32433; 5 pages.

International Preliminary Report on Patentability, dated Apr. 3, 2006, directed to related International Patent Application No. PCT/US2004/032433; 6 pages.

International Search Report, mailed Sep. 15, 2005 directed to counterpart International Patent Application No. PCT/US04/33687; 2 pages.

Supplementary European Search Report, mailed Mar. 26, 2008, directed to counterpart European Patent Application No. EP-04794917.7; 3 pages.

International Preliminary Report on Patentability, dated Feb. 5, 2008, directed International Patent Application No. PCT/US2006/029537; 5 pages.

Su et al., U.S. Office Action mailed Jun. 15, 2006, directed to U.S. Appl. No. 10/954,023; 7 pages.

Su et al., U.S. Office Action mailed Dec. 1, 2006, directed to U.S. Appl. No. 10/954,023; 9 pages.

Su et al., U.S. Office Action mailed Jun. 13, 2007, directed to U.S. Appl. No. 10/954,023; 5 pages.

Su et al., U.S. Office Action mailed Sep. 18, 2007, directed to U.S. Appl. No. 10/954,023; 7 pages.

Su et al., U.S. Office Action mailed Mar. 17, 2008, directed to U.S. Appl. No. 10/954,023; 9 pages.

Su et al., U.S. Office Action mailed Sep. 18, 2008, directed to U.S. Appl. No. 10/954,023; 11 pages.

Su et al., U.S. Office Action mailed Dec. 22, 2008, directed to U.S. Appl. No. 11/705,127; 10 pages.

Su et al., U.S. Office Action mailed Jun. 9, 2009, directed to U.S. Appl. No. 11/705,127; 8 pages.

Su et al., U.S. Office Action mailed Aug. 25, 2005, directed to U.S. Appl. No. 10/690,709; 5 pages.

Su et al., U.S. Office Action mailed Feb. 27, 2006, directed to U.S. Appl. No. 10/690,709; 4 pages.

Su et al., U.S. Office Action mailed Jan. 3, 2008, directed to U.S. Appl. No. 11/107,928; 13 pages.

Su et al., U.S. Office Action mailed Jul. 11, 2008, directed to U.S. Appl. No. 11/107,928; 15 pages.

Su et al., U.S. Office Action mailed Oct. 8, 2008, directed to U.S. Appl. No. 11/107,928; 14 pages.

Su, T., U.S. Office Action mailed Jun. 25, 2008, directed to U.S. Appl. No. 11/194,768; 16 pages.

Su, T., U.S. Office Action mailed Dec. 12, 2008, directed to U.S. Appl. No. 11/194,768; 11 pages.

Su, T., U.S. Office Action mailed May 28, 2009, directed to U.S. Appl. No. 11/194,768; 12 pages.

Su et al., U.S. Office Action mailed Apr. 1, 2008, directed to U.S. Appl. No. 11/484,589; 9 pages.

Su et al., U.S. Office Action mailed Sep. 22, 2008, directed to U.S. Appl. No. 11/484,589; 11 pages.

Su et al., U.S. Office Action mailed Mar. 5, 2009, directed to U.S. Appl. No. 11/484,589; 5 pages.

Su, T., U.S. Office Action mailed Dec. 18, 2009, directed to U.S. Appl. No. 11/194,768; 10 pages.

* cited by examiner

TIE-LAYER FOR POLYOLEFIN FILMS

CROSS REFERENCE TO RELATED APPLICATION

This application claims the benefit of U.S. Provisional Application Ser. No. 60/679,251 filed May 10, 2005.

FIELD OF INVENTION

This invention relates to biaxially oriented films that include a non-anhydride-grafted polyolefin tie-layer. These tie-layer formulations exhibit exceptional adherence to polar polymers and exhibit superior gas barrier characteristics over a polyolefin film alone.

BACKGROUND OF INVENTION

Anhydride-grafted polyolefins have been widely used as tie-layers or compatibilizing resins for bonding polar polymers to polyolefin substrates either in coextrusion applications or extrusion-coating applications. In particular, maleic anhydride-grafted polypropylenes and polyethylenes have been popular and useful in bonding polar resins such as ethylene vinyl alcohol copolymers (EVOH), polyamides, ionomers, and polyvinyl alcohol copolymers (PVOH). The use of these polar resins is of interest because they impart high gas barrier properties to the coextruded or coated polyolefin film substrate. These anhydride-grafted polyolefins are used either as discrete tie-layers between the polar polymer and the substrate layer or blended with non-grafted polyolefin homopolymer or copolymer to improve the compatibility of the substrate polyolefin with the polar material. Such polar resins like EVOH materials typically require the use of adhesion promoters and/or tie-layer resins in order for them to bond adequately to polyolefin substrates. Without such tie resins, EVOH materials or related materials like PVOH tend to peel off easily from the polyolefin substrate, resulting in loss of barrier properties and poor appearance.

Accordingly, several known tie-layers exist for EVOH materials. For example, U.S. Pat. No. 4,650,721 discloses a process to improve the otherwise poor bonding of EVOH or PVOH layers in oriented films through the use of tie resins, namely maleic anhydride acid-grafted polyolefins.

U.S. Pat. No. 5,153,074 discloses metallized oriented multilayer films that include EVOH and blends of a maleic anhydride-modified propylene homopolymer or copolymer as the substrate to which the EVOH is contiguously adhered. The EVOH layer is used as a metallizing surface for the vapor deposition of aluminum. Again, the use of an adhesion-promoting material is important. It is known that EVOH is relatively hard to stretch compared to polypropylene. Consequently, only limited grades of EVOH, for example one with 48 mole % of ethylene, can be co-processed with OPP without forming any surface defects. Using lower ethylene mole % EVOH (e.g. 44% or 38%) in biaxial orientation causes surface defects like stress fractures or process issues like film breaks due to the higher crystallinity of the EVOH.

U.S. Pat. No. 5,175,054 discloses the solution-coating of a mixture of solution-grade EVOH or PVOH containing about 80 wt. % of vinyl alcohol and aqueous dispersion-grade of the ionomer of the alkali salt of ethylene-methacrylic acid copolymer. This coating is applied to an oriented polymer substrate and subsequently metallized. The ionomer acts as an adhesion promoter to assure adequate adhesion of the EVOH or PVOH to the polyolefin (polypropylene) substrate which is otherwise poor without the presence of the ionomer.

U.S. Pat. No. 5,688,556 discloses polymeric film structures using EVOH or amorphous nylon layers wherein tie-layer materials like maleic anhydride-modified polypropylenes are employed as adhesion promoters.

U.S. Patent Publication No. 2005-0186414 describes polymeric film structures using EVOH/amorphous nylon blends as barrier layers coextruded with a polyolefin core layer blended with an adhesion-promoting resin. This adhesion-promoting resin is a carboxylic acid-modified polyolefin or an anhydride-grafted polyolefin. World Patent Application WO 02/45958 also describes polymeric film structures employing EVOH and amorphous nylon blends wherein a tie-layer material such as anhydride-grafted polypropylene is required to promote adhesion between the polar blend and the polyolefin substrate.

The prior art uses anhydride-grafted polyolefins as tie-layer resins for bonding polar polymers. One of the limitations of grafting polyolefins with anhydride groups is that the amount of anhydride is usually limited to 1 wt. % or less. Grafting more anhydride than this onto the polyolefin can result in degradation of the polyolefin. This limit on the amount of anhydride grafting can limit the adhesion promoting performance of the tie-layer resin.

The adhesion between a polar and a non-polar layer depends upon their chemistry and physics. Chemically, it depends upon the interaction forces between them. Physically, it depends upon the stiffness and thickness of the layers. To facilitate adequate bonding between polar and non-polar materials, a tie-layer or adhesion promoter is usually utilized. Such tie-layers typically incorporate some degree of polar functionality to promote compatibility with the polar material of interest, yet not too high a degree of polar functionality in order to maintain compatibility with the non-polar material. This can be important during coextrusion processes and subsequent orientation of these cast coextruded products in oriented films. Without using such a tie-layer between for example, EVOH and polypropylene in a coextruded film process, the EVOH layer can separate from the polypropylene basefilm during casting. Also, the EVOH can delaminate and wrap downstream rollers such as machine direction orientation (MDO) processes during machine direction stretching. Using a tie-layer to promote adhesion between the EVOH and polypropylene avoids this problem.

Polyolefins such as polyethylene and polypropylene are often grafted with maleic anhydride to produce polar functionalized polymers and have proven to be effective as a tie-layer or adhesion promoter for bonding non-polar polypropylene or polyethylene to a polar polymer such as EVOH. The amount of grafting can control the effectiveness of the tie-layer, i.e. the higher the amount of anhydride grafting, the more effective it can be as an adhesion promoter for bonding polar materials to non-polar materials. In addition, most anhydride-grafted polyolefins contain rubbers as a tie-layer to enhance the adhesion between polar and non-polar materials. This rubber component of the tie-layer helps improve adhesion by being relatively softer and more flexible and thus conform better to the more crystalline polar (e.g. EVOH) and non-polar (e.g. polypropylene) materials of interest. However, if the rubber content is too high or too much tie-layer resin is used, the resultant film produced is often very hazy and aesthetically less pleasing.

The amount of grafting is limited as such anhydrides can cause degradation of the polyolefin chain it is grafted to. This can usually be seen in a large increase in melt flow rates after grafting. For example, many anhydride-grafted polypropylenes are limited to 0.5 wt. % anhydride (typically less than 1 wt. % anhydride) due to this issue with polymer degradation.

At 1 wt. % or more anhydride, the polypropylene melt flow rate increases greatly, melt strength and molecular weight is decreased significantly, to the point where it is unsuitable for oriented film production or casting. In addition, there can be limitations imposed upon the amount of anhydride grafting for food packaging applications due to FDA regulations.

Besides anhydride-grafted polyolefins, ethylene polar terpolymers such as Arkema's LOTADER resins have been used as a tie-layer between polyethylene and polar resins like EVOH. However, versions of these ethylene polar terpolymers have typically shown poor effectiveness as a tie-layer for polypropylene and polar resins and thus, have not been used in oriented polypropylene film applications. Typically, only high co-monomer content (e.g. 16-25 wt. % butyl acrylate or methyl acrylate co-monomer) ethylene polar terpolymers can be effectively used to bond to polypropylene substrates. Unfortunately, the drawbacks of such high co-monomer content ethylene polar terpolymers are that their melting points are much lower than the low content co-monomer versions (77-90° C. vs. 105-107° C., respectively), so the material is much softer (modulus 20-60 MPa vs. 110-120 MPa, respectively) and stickier (Vicat softening point 40-55° C. vs. 65-80° C., respectively). Consequently, in film extrusion and orientation, the use of these high co-monomer content ethylene polar terpolymer materials can result in severe processing problems such as resin pellet bridging in the resin feed system of the extruder throat, sticking and subsequent film breakage of the film due to the cast roll, MDO rolls, and other downstream processes which involve heat for orientation and heat-setting. Thus, the LOTADER materials are not effective for polypropylene film manufacturing because: 1) if low co-monomer content ethylene polar terpolymer is used, poor adhesion is found to the polypropylene; 2) if high co-monomer content ethylene polar terpolymer is used, poor processability results from the extrusion, casting, and orientation processes.

The chemistry and composition of the LOTADER ethylene polar terpolymers are different from anhydride-grafted polyolefins. The former ones are made by polymerization with 3 co-monomers (i.e. ethylene, butyl or methyl acrylate, and maleic anhydride or glycidyl methacrylate), and the polar functional groups are incorporated as part of the polymer chain's backbone. In contrast, the anhydride-grafted polyolefins are made by grafting the functional anhydride groups onto the side chains of a polymer via radical reactions. The degree in which anhydride groups can be grafted onto polypropylene or ethylene-propylene copolymers is limited because this radical reaction used in the grafting process results in a competing reaction: chain scission of the polypropylene backbone at the tertiary carbons. Normally, high molecular weight anhydride-grafted polypropylene or ethylene-propylene copolymer contain less than 1 wt. % of the anhydride groups for this reason. Popular anhydride-grafted resins such as Mitsui's ADMER product line and Dupont's BYNEL product line are of this type. Some low molecular weight anydride-grafted polypropylenes available from Crompton contain more than 1 wt. % of anhydride functional groups, however, the reason they are low molecular weight is due to the degradation caused by the relatively high amount of anhydride grafting. Such low molecular weight/high anhydride content grafted materials have been used as coupling agents; however, they are not suitable for use as a tie-layer in oriented film applications.

SUMMARY OF THE INVENTION

This invention seeks to avoid some of the disadvantages of anhydride-grafted polyolefins and offers an alternative tie-layer formulation to such materials. This invention also provides a method to improve the barrier properties of biaxially oriented films and metallized films resulting in a packaging film with excellent gas barrier properties. The invention helps solve the problems associated with adhering polar polymers to non-polar polyolefin substrates in coextrusion or extrusion coating applications and limitations of using anhydride-grafted polyolefins as tie-layer materials.

In one embodiment the laminate film includes a first polyolefin resin layer including 50-95 wt. % ethylene-propylene copolymer and 5-50 wt. % ethylene polar terpolymer, and a layer including a polar polymer on one side of the first polyolefin resin layer.

Preferably, the ethylene polar terpolymer includes an ethylene co-monomer, a butyl acrylate co-monomer or a methyl acrylate co-monomer, and a maleic anhydride co-monomer or a glycidyl methacrylate co-monomer. Preferably, the ethylene polar terpolymer includes 25 wt. % or less butyl acrylate co-monomer and methyl acrylate co-monomer. Preferably, the ethylene content of the ethylene-propylene copolymer is 0.5 to 70 mole %.

Preferably, the polar polymer is an ethylene vinyl alcohol, polyvinyl alcohol, amorphous nylon, polyetheramine or blends thereof. Preferably, the polar polymer includes an ethylene vinyl alcohol and an ethylene content of the ethylene vinyl alcohol is at least 48 mole % ethylene. Preferably, the polar polymer includes a polyetheramine including a copolymer of bis-phenol A diglycidyl ether and at least 30 wt. % resorcinol diglycidyl ether with ethanolamine.

Preferably, the laminate film also includes a second polyolefin resin layer on the first polyolefin resin layer. The second polyolefin resin layer may include an isotactic propylene homopolymer.

Preferably, the laminate film also includes a third polyolefin resin layer on the second polyolefin resin layer opposite the side with the first polyolefin resin layer. The third polyolefin resin layer may include a heat-sealable polyolefin selected from propylene copolymers, terpolymers, polyethylene and combinations thereof.

Preferably, the third polyolefin resin layer is a winding layer including a crystalline polypropylene and an inorganic antiblocking agent. The third polyolefin resin layer may be a matte winding layer having a roughened surface and including a block copolymer blend of polypropylene and one or more other polymers, and the third poly has a roughened surface. The winding layer may be a discharge treated winding layer. The winding layer may also be laminated, coated with an adhesive or coated with an ink.

Preferred antiblock components for the winding layer include amorphous silicas, aluminosilicates, sodium calcium aluminum silicate, a crosslinked silicone polymer, and polymethylmethacrylate.

Preferably, the heat-sealable layer also includes an antiblock component selected from amorphous silicas, aluminosilicates, sodium calcium aluminum silicate, a crosslinked silicone polymer, and polymethylmethacrylate.

Preferably, the first polyolefin resin layer is a discharge-treated polyolefin resin layer. Preferably, the polar polymer resin layer is a discharge-treated polar polymer resin layer formed in an atmosphere of $CO_2$ and $N_2$.

Preferably, the laminate film also includes a vacuum deposited metal layer on the polar polymer resin layer. Preferably, the metal layer has a thickness of about 5 to 100 nm and an optical density of about 1.5 to 5.0. Preferably, the metal layer includes aluminum.

Preferably, the laminate film is an extruded laminate film. Preferably, the film is for packaging a food product.

Another embodiment is a method of producing a film. The method includes providing a film including a first polyolefin resin layer including 50-95 wt. % ethylene-propylene copolymer and 5-50 wt. % ethylene polar terpolymer, and applying a layer including a polar polymer on one side of the first polyolefin resin layer.

Preferably, the polar polymer is applied as an aqueous solution. The aqueous solution may be applied in an in-line or out-of-line method. Preferably, the method also includes vacuum depositing a metal layer on the polar polymer resin layer.

Yet another embodiment is a method of producing a film. The method includes co-extruding a polyolefin resin layer including 50-95 wt. % ethylene-propylene copolymer and 5-50 wt. % ethylene polar terpolymer, and a layer including a polar polymer on one side of the first polyolefin resin layer.

DETAILED DESCRIPTION OF THE INVENTION

It has been found that a blend of ethylene-propylene copolymer and low or high co-monomer content ethylene polar terpolymers (also known as ethylene-acrylic acid-maleic anhydride terpolymers) such as ethylene-butyl acrylate-maleic anhydride copolymer, ethylene-methyl acrylate-maleic anhydride copolymer, or ethylene-methyl acrylate-glycidil methacrylate copolymer, or blends thereof, can make for an effective tie-layer formulation as an alternative to anhydride-grafted polyolefins. This blend is very effective as a tie-layer formulation for promoting adhesion between polypropylene substrates and polar materials such as EVOH. The blends offer surprising advantages over the use of low co-monomer content ethylene polar terpolymers alone which have been shown not to be an effective tie-layer for bonding polypropylene and EVOH. The blends also offer a surprising advantage over the use of high co-monomer content ethylene polar terpolymers alone in that not only are the adhesion-promoting properties maintained, but also the processability of such a tie-layer blend in coextrusion and biaxially oriented film processes is considerably more efficient and stable.

In one embodiment of the invention, the laminate film includes a mixed resin tie-layer. The mixed resin tie-layer preferably includes an ethylene-propylene copolymer resin layer blended with an amount of a low or high co-monomer content ethylene polar terpolymer, with one side of the film being discharge-treated for high surface energy suitable for printing or coating. An isotactic propylene homopolymer core layer is preferably disposed on one side of the mixed resin tie-layer, opposite the discharge-treated side. A heat-sealable ethylene-propylene-butene terpolymer layer is preferably coextruded onto one side of the core layer opposite the mixed resin tie-layer side. A polar polymer layer is coated or extruded onto the discharge-treated surface of the mixed resin tie-layer.

The polypropylene resin core layer is preferably a crystalline polypropylene of specific isotactic content and can be uniaxially or biaxially oriented. Crystalline polypropylenes are generally described as having an isotactic content of about 90% or greater. Suitable examples of crystalline polypropylenes for this invention are Fina 3270 and ExxonMobil PP4772. These resins also have melt flow rates of about 0.5 to 5 g/10 min, a melting point of about 163-167° C., a crystallization temperature of about 108-126° C., a heat of fusion of about 86-110 J/g, a heat of crystallization of about 105-111 J/g, and a density of about 0.90-0.91. The core resin layer is typically about 5 µm to about 50 µm in thickness after biaxial orientation, preferably between about 10 µm and about 25 µm, and more preferably between about 12.5 µm and about 17.5 µm in thickness. Additionally, a small amount of inorganic antiblocking agent may be optionally added. Preferably, the amount of inorganic antiblocking agents in the resin layer is less than or equal to about 1000 ppm. More preferably, about 300-500 ppm of antiblock agent is added. Preferred antiblock agents include inorganic silicas, sodium calcium aluminosilicates, crosslinked silicone polymers such as polymethylsilsesquioxane, and polymethylmethacrylate spheres. Typical useful particle sizes of these antiblocks range from about 1-12 µm, preferably in the range of about 2-6 µm.

The mixed resin tie-layer includes a blend of ethylene-propylene copolymer and ethylene polar terpolymers such as ethylene-butyl acrylate-maleic anhydride copolymer, ethylene-methyl acrylate-maleic anhydride, or ethylene-methyl acrylate-glycidal methacrylate copolymer. This mixed resin blend layer acts as the "tie-layer" to bond effectively a polar polymer layer such as EVOH to the propylene homopolymer core layer. The ethylene-propylene copolymer (EP copolymer) can be one or more of any number of commercially available EP copolymers, ranging from 0.5 mole % ethylene to about 70 mole % ethylene. Preferred EP copolymers for this tie-layer blend are for example, Total 8473 (a nominal 4 mole % ethylene content EP copolymer) and Lanxess Buna EP-T-2070-P (a nominal 65-71 mole % ethylene content EP copolymer). Preferably, the EP copolymer component of this tie-layer blend is in the 3-6 mole % ethylene content range. Of these EP copolymers, Total 8473 is particularly preferred.

Preferred ethylene polar terpolymers for this tie-layer blend are available from Arkema and include: LOTADER 3210 or 4210 (an ethylene-butyl acrylate-maleic anhydride terpolymer) or LOTADER AX8900 (an ethylene-methyl acrylate-glycidal methacrylate terpolymer). LOTADER 3210 is a copolymer of about 91 wt. % ethylene, 6 wt. % butyl acrylate, and 3 wt. % maleic anhydride; LOTADER 4210 is about 90 wt. % ethylene, 7 wt. % butyl acrylate, and 3.6 wt. % maleic anhydride. It should be noted that LOTADER 3210 and 4210 are not grafted maleic anhydride polymers like Mitsui's ADMER QF551A or QF500A. LOTADER AX8900 is a copolymer of about 67 wt. % ethylene, 25 wt. % methyl acrylate, and 8 wt. % glycidyl methacrylate. Preferably, the amount of the butyl or methyl acrylate co-monomer in the ethylene polar terpolymer should be about 25 wt. % or less, more preferably 5-16 wt. % of the terpolymer. For ease of processability in extrusion and orientation processes, the amount of butyl or methyl acrylate co-monomer is preferably 1-10 wt. % of the terpolymer, more preferably 5-8 wt. % of the terpolymer. Of these low co-monomer content ethylene polar terpolymers, LOTADER 4210 is particularly preferred for use in this mixed resin tie-layer blend for its combination of adhesion promoting properties and processability in extrusion. The blending ratio of this alternate tie-layer formulation is 50-95 wt. % EP copolymer to 50 wt. %-5 wt. % of the ethylene polar terpolymer respectively. Preferred is about 5 wt. % to 40 wt. % of the ethylene polar terpolymer, more preferred is 10-20 wt. % of the ethylene polar terpolymer, with the respective balance made up of the EP copolymer.

The mixed resin tie-layer can be coextruded on one side of the core layer having a thickness after biaxial orientation between 0.1 and 5 µm, preferably between 0.5 and 3 µm, and more preferably between 0.5 and 1.0 µm. For the mixed resin tie-layer blend, it is also contemplated to add an antiblock to aid in film handling. A small amount of inorganic antiblocking agent may be optionally added up to 1000 ppm to this resin layer. Preferably 300-500 ppm of antiblock may be added. Preferred antiblock agents include inorganic silicas, sodium calcium aluminosilicates, crosslinked silicone polymers such as polymethylsilsesquioxane, and polymethylmethacrylate spheres. Typical useful particle sizes of these antiblocks range from 1-12 µm, preferably in the range of 2-6 µm.

The mixed resin tie-layer can be optionally surface-treated with either a corona-discharge method, flame treatment, atmospheric plasma, or corona discharge in a controlled atmosphere of nitrogen, carbon dioxide, or a mixture thereof. The latter treatment method in a mixture of $CO_2$ and $N_2$ is preferred. This method of discharge treatment results in a treated surface that includes nitrogen-bearing functional groups, preferably 0.3% or more nitrogen in atomic %, and more preferably 0.5% or more nitrogen in atomic %. This treated mixed resin tie-layer can then be metallized, printed, coated, or extrusion or adhesive laminated. Preferably, it is coextruded with a layer of EVOH or coated with a layer of PVOH or polyetheramine.

A heat-sealable layer or non-heat sealable layer may be coextruded with the core layer opposite the mixed resin tie-layer. The heat-sealable layer preferably has a thickness after biaxial orientation between 0.2 and 5 µm, more preferably between 0.6 and 3 µm, and most preferably between 1.0 and 2.0 µm. The heat-sealable layer may contain an anti-blocking agent and/or slip additives for good machinability and a low coefficient of friction in about 0.05-0.5% by weight of the heat-sealable layer. The heat-sealable layer preferably is a copolymer of propylene, either ethylene-propylene or butylene-propylene, and preferably includes a ternary ethylene-propylene-butene copolymer as well. A preferred heat-sealable terpolymer resin is Sumitomo SPX79F1. The film may include a non-heat sealable winding layer. Preferably, this layer includes a crystalline polypropylene with anti-blocking and/or slip additives or a matte layer of a block copolymer blend of polypropylene and one or more other polymers whose surface is roughened during the film formation step so as to produce a matte finish on the winding layer. Preferably, the surface of the winding layer is discharge-treated to provide a functional surface for lamination or coating with adhesives and/or inks.

The coextrusion process may include a three- or four-layered compositing die. The polymer core layer is preferably sandwiched between the mixed resin tie-layer and the heat sealable or winding layer. The multilayer laminate sheet may be cast onto a cooling drum whose surface temperature is controlled between 20° C. and 60° C. to solidify the non-oriented laminate sheet. The non-oriented laminate sheet is preferably stretched in the longitudinal direction at about 135 to 165° C. at a stretching ratio of about 4 to about 5 times the original length and the resulting stretched sheet is cooled to about 15° C. to 50° C. to obtain a uniaxially oriented laminate sheet. The uniaxially oriented laminate sheet can be introduced into a tenter and preliminarily heated between 130° C. and 180° C., and stretched in the transverse direction at a stretching ratio of about 7 to about 12 times the original width and then heat-set or annealed to reduce internal stresses due to the orientation, minimize shrinkage and give a relatively stable biaxially oriented sheet. The biaxially oriented film preferably has a total thickness between 6 and 40 µm, more preferably between 10 and 20 µm, and most preferably between 12 and 18 µm.

The polar polymer layer may be applied to the mixed resin tie-layer in a number of known manners. The method of applying the polar polymer will depend upon the characteristics of the selected polar polymer. EVOH, for example, of at least 48 mole % ethylene can be coextruded with polyolefins and biaxially oriented; EVOH of lower than 48 mole % ethylene can be extrusion coated onto a biaxially oriented polyolefin substrate. PVOH can be aqueous solution-coated onto a biaxially oriented polyolefin substrate. Amorphous nylons can be coextruded with polyolefin layers and biaxially oriented.

Polar resins such as EVOH resins may be coextruded with the mixed resin tie-layer and the propylene homopolymer core layer in a multi-layered compositing die as mentioned previously. In a co-extrusion process coextrude the polar polymer may be co-extruded along with the substrate mixed resin tie-layer or tie-resin modified core layer through a compositing die whereupon the molten multilayer film structure is quenched upon a chilled casting roll system or casting roll and water bath system.

Compositing dies can be designed with 3, 4, or more layers for coextrusion. For biaxial film orientation, it is preferable to use EVOH resins that are at least 48 mole % ethylene in order to be non-crystalline enough to biaxially orient without film breakage.

It is also contemplated to produce a laminate structure in which the polar polymer layer is sandwiched between two outer film substrates (which may be multilayer structures themselves). The outer film substrates may be the same in composition or not; the polar polymer in this case can be thought of as a laminating adhesive adhering the two outer substrates together. The two outer substrates may be comprised of the mixed resin tie-layer as well, either as a mixed resin blend or as a discrete layer as part of the overall respective outer substrate. For example, polyetheramine as an aqueous solution can be coated onto the mixed resin tie-layer side of the laminate film structure formed by coextrusion, dried, and oriented. The polyetheramine polymer has preferably 10-70 wt. % co-monomer content, more preferably 30-50 wt. % resorcinol diglycidyl ether (RDGE) co-monomer content. The % solids of the aqueous solution is from 10-50 wt. %, preferably 15-40 wt. %, and more preferably 25-35 wt. % with a viscosity of less than 50 cps. After drying, the dry coating weight of the polyetheramine layer is preferably 0.3-5 mg/in$^2$, more preferably 0.5-3.0 mg/in$^2$, and most preferably 0.6-1.5 mg/in$^2$.

Similarly, aqueous solutions of a polar polymer such as PVOH can be applied to the mixed resin tie-layer surface. The aqueous coatings can be applied either "in-line" or "out-of-line." In an "in-line" coating, the coating station is located after the machine direction stretching process of a monoaxial or biaxial orientation process, and the coated film is dried in a drying oven or using the tenter oven preheating zones as a dryer. In particular, a preferred in-line coating method of applying the polar polymer solution is by gravure coating. In this configuration, the coating station is placed between the machine direction orientation section and the transverse direction orientation section of a sequential biaxial orientation line. Thus, the polar polymer coating is applied on the tie-layer resin-containing surface of the substrate after machine direction orientation of the substrate but before the transverse direction orientation of the substrate. The transverse direction orientation section's preheat ovens effectively act as a drier to remove the solvent, leaving the polar polymer adhered to the substrate. The substrate is stretched in the transverse direction, thus completing the biaxial orientation process. In the case of a simultaneous biaxial orientation process which does not have a separate machine direction orientation section, the in-line coating station can be placed between the casting section and the orientation oven. An advantage of this process is that the orientation and coating of the invention can be essentially done in one processing step.

It can be beneficial to in-line discharge treat the monoaxially oriented substrate prior to the coating station in order that the aqueous solution adequately "wets" the substrate surface for consistent coating weight, drying, and appearance, but it is not always necessary with the tie-layer resin formulation. In an "out-of-line" coating process, the finished monoaxially oriented or biaxially oriented film is wound up in a roll form, and is mounted on a separate coating machine. Again, the monoaxial or biaxial film substrate can have the desired surface for coating with the polar polymer solution discharge-treated in order to help ensure that the solution adequately wets the surface. This separate coating line will then apply the solution, dry it, and rewind the finished product. The preferred method to coat in this embodiment is via the in-line coating process. In this case, the use of the mixed resin tie-layer is most advantageous to improve adhesion of the polar polymer to the propylene-based resin substrate.

In another embodiment, the mixed resin tie-layer need not be a discrete layer coextruded onto one side of the core layer. The core layer itself can include a blend of the propylene homopolymer and the tie-layer formulation of ethylene-propylene copolymer and ethylene polar terpolymer. In this embodiment, the polar polymer coating or coextrusion can be applied directly to one side of the mixed resin core layer.

A preferred embodiment is to metallize the surface of the polar polymer layer. The unmetallized laminate sheet is first wound on a roll. The roll is placed in a metallizing chamber and the metal vapor-deposited on the polar polymer resin layer surface. The metal film may include titanium, vanadium, chromium, manganese, iron, cobalt, nickel, copper, zinc, aluminum, gold, or palladium, the preferred being aluminum. Metal oxides can also be coated, the preferred being aluminum oxide. The metal or metal oxide layer should have a thickness between 5 and 100 nm, preferably between 20 and 80 nm, more preferably between 30 and 60 nm; and an optical density between 1.5 and 5.0, preferably between 2.0 and 4.0, more preferably between 2.3 and 3.2. The metallized film is then tested for oxygen and moisture permeability, optical density, metal adhesion, and film durability.

An example of a laminate film may include a polar polymer such as an amorphous nylon, polyvinyl alcohol copolymer, or ethylene vinyl alcohol copolymer layer on a first polyolefin resin-containing layer. Other polar polymers can be utilized as well such as polyetheramines. The first polyolefin layer is a mixed resin tie-layer that can adhere directly to the polar polymer-containing layer. The laminate film may also include a second polyolefin resin-containing layer on the first polyolefin resin-containing layer. This second polyolefin resin-containing layer could be a core layer to provide the bulk strength of the laminate film. Furthermore, the laminate could further include a third polyolefin resin-containing layer on the second polyolefin resin-containing core layer opposite the side with the first polyolefin resin-containing tie-layer.

The second polyolefin resin-containing layer can include a propylene homopolymer or copolymer. More preferable is an isotactic propylene homopolymer to act as the core or base layer of the laminate film.

The third polyolefin resin-containing layer can include a heat-sealable polyolefin. Preferred polyolefin resin-containing layers include propylene copolymers, terpolymers, polyethylene and combinations thereof. In another variation of the third polyolefin resin-containing layer, the heat-sealable layer includes an antiblock component, for example, amorphous silicas, aluminosilicates, sodium calcium aluminum silicate, a crosslinked silicone polymer, and polymethylmethacrylate.

Alternatively, the third polyolefin resin-containing layer could include a winding layer with a crystalline polypropylene and an inorganic antiblocking agent. The third polyolefin resin-containing layer including the winding layer can have a matte layer of a block copolymer blend of propylene and one or more other monomers such as ethylene. The matte layer can have a roughened surface while the winding layer can be discharge treated for lamination or coating with adhesives or inks. The winding layer can include an antiblock component, for example, amorphous silicas, aluminosilicates, sodium calcium aluminum silicate, a crosslinked silicone polymer, and polymethylmethacrylate.

Further preferably, the polar polymer resin-containing layer is a discharge-treated polar polymer resin-containing layer. The discharge-treated polar polymer resin-containing layer may have a discharge-treated surface formed in an atmosphere of $CO_2$ and $N_2$. The laminate film could further include a vacuum-deposited metal layer on the polar polymer resin-containing layer.

The films can used to produce flexible packaging. The characteristics of the films are especially useful for flexible packaging for food products. For example, a biaxially oriented polyolefin multi-layer film may be provided with a skin of polar polymer to enhance barrier and printing properties for flexible packaging purposes. The biaxially oriented multi-layer barrier films may also be metallized to improve the barrier characteristics. Flexible barrier packaging may also be provided using laminate structures of polyolefin layers and polar polymer layers for barrier applications in flexible packaging.

All these films can also be metallized via vapor-deposition, preferably a vapor-deposited aluminum layer, with at least an optical density of about 1.5, preferably with an optical density of about 2.0 to 4.0, and even more preferably between 2.3 and 3.2.

This invention will be better understood with reference to the following non-limiting examples, which are intended to illustrate specific embodiments within the overall scope of the invention.

EXAMPLE 1

A 4-layer coextruded article included a core layer of a polypropylene resin. A mixed resin tie-layer of 20 wt. % LOTADER 4210 low co-monomer content (ca. 7 wt. % butyl acrylate) ethylene polar terpolymer and 80 wt. % TOTAL 8473 ethylene propylene copolymer (ca. 4 mole % ethylene) was coextruded on one side and, upon the side of the core layer opposite the mixed resin tie-layer, a layer of a terpolymer sealant was disposed. The terpolymer sealant is coextruded with EVOH resin from EVALCA of about 48 mole % ethylene (EVALCA G176B). The total thickness of this film substrate after biaxial orientation is 70 G or 0.7 mil. The thickness of the respective mixed resin tie-layer and sealant skin layers after biaxial orientation is 4 G and 6 G. The thickness of the EVOH layer after biaxial orientation is about 4 G. The core is comprised of polypropylene. The thickness of the core layer after biaxial orientation is 56 G. The mixed resin tie-layer and core layer is melt extruded at 450-500° F. where the propylene homopolymer of the core layer is ExxonMobil PP4772. The EVOH layer is melt extruded at 440-460° F. The sealant layer comprises an ethylene-propylene-butene terpolymer such as Sumitomo SPX79F1 and 4000 ppm of an inorganic antiblock additive such as Toshiba TOSPEARL 120, a crosslinked silicone polymer of nominal 2.0 um particle size and is melt extruded at 450-480° F. The 4-layer coextrudate was passed through a flat die to be cast on a chill drum of 100-180° F. The formed cast sheet was passed through a series of heated rolls at 210-270° F. with differential speeds to stretch in the machine direction (MD) from 4 to 6 stretch ratio. This was followed by transverse direction (TD) stretching from 8 to 10 stretch ratio in the tenter oven at 310-350° F. The resultant clear film was tested for adhesion and gas barrier properties of the EVOH polar polymer layer to the substrate. The clear film was also metallized via aluminum vapor deposition and tested for gas barrier properties.

EXAMPLE 2

A process similar to Example 1 was repeated except that the mixed resin tie-layer included a blend of 40 wt. % LOTADER 4210 and 60 wt. % TOTAL 8473. The clear film was tested for adhesion and gas barrier properties of the EVOH polar polymer layer to the substrate. The clear film was also metallized and tested for gas barrier properties.

EXAMPLE 3

A process similar to Example 1 was repeated except that the mixed resin tie-layer included a blend of 20 wt. % LOTADER 4210 and 80 wt. % Lanxess Buna EP T2070P ethylene-propylene copolymer of ca. 65-71 mole % ethylene. The clear film was tested for adhesion and gas barrier properties of the EVOH polar polymer layer to the substrate. The clear film was also metallized and tested for gas barrier properties.

EXAMPLE 4

A process similar to Example 1 was repeated except that the mixed resin tie-layer comprised 40 wt. % LOTADER AX8900 high co-monomer content (25 wt. % methyl acrylate) ethylene polar terpolymer and 60 wt. % Total 8473 ethylene propylene copolymer. The resultant clear film was then tested for adhesion and gas barrier properties of the EVOH polar polymer layer to the substrate. The clear film was also metallized and tested for gas barrier properties.

COMPARATIVE EXAMPLE 1

A process similar to Example 1 was repeated except that the mixed resin tie-layer included 100 wt. % of Mitsui ADMER QF551 maleic anhydride-grafted ethylene-propylene copolymer. The resultant clear film was then tested for adhesion and gas barrier properties of the EVOH polar polymer layer to the substrate. The clear film was also metallized and tested for gas barrier properties.

COMPARATIVE EXAMPLE 2

A process similar to Example 1 was repeated except that the mixed resin tie-layer comprised a blend of 20 wt. % Evalca G176B EVOH and 80 wt. % Total 8473. The resultant clear film was then tested for adhesion and gas barrier properties of the EVOH polar polymer layer to the substrate. The clear film was also metallized and tested for gas barrier properties.

COMPARATIVE EXAMPLE 3

A process similar to Example 1 was repeated except that the mixed resin tie-layer was 100 wt. % of Lanxess Buna EP T2070P ethylene-propylene copolymer. The resultant clear film was then tested for adhesion and gas barrier properties of the EVOH polar polymer layer to the substrate. The clear film was also metallized and tested for gas barrier properties.

COMPARATIVE EXAMPLE 4

A process similar to Example 1 was repeated except that the mixed resin tie-layer comprised 100 wt. % of Total 8473 ethylene-propylene copolymer. The resultant clear film was then tested for adhesion and gas barrier properties of the EVOH polar polymer layer to the substrate. The clear film was also metallized and tested for gas barrier properties.

The adhesion properties of the Examples and Comparative Examples ("CEx.") are shown in Table 1.

TABLE 1

| Example | Mixed Resin Tie-layer Blend | EVOH Adhesion[1] | Clear film O2TR cc/100 in$^2$/day | Metallized film O2TR cc/100 in$^2$/day | Nominal Optical Density |
|---|---|---|---|---|---|
| 1 | 20 wt. % LOTADER 4210 80 wt. % TOTAL 8473 | 4 | 3.8 | 0.07 | 2.3 |
| 2 | 40 wt. % LOTADER 4210 60 wt. % TOTAL 8473 | 4 | 3.3 | 0.07 | 2.3 |
| 3 | 20 wt. % LOTADER 4210 80 wt. % BUNA EP T2070P | 4 | 5.79 | 0.08 | 2.3 |
| 4 | 40 wt. % LOTADER AX8900 60 wt. % FINA 8473 | 4 | 2.63 | 0.06 | 2.3 |
| CEx. 1 | 100 wt. % ADMER QF551 | 4 | 4.09 | 0.09 | 2.3 |
| CEx. 2 | 20 wt. % EVALCA G176B 80 wt. % TOTAL 8473 | 2 | 6.76 | 0.04 | 2.3 |
| CEx. 3 | 100 wt. % BUNA EP T2070P | 2 | 7.22 | 0.09 | 2.3 |
| CEx. 4 | 100 wt. % TOTAL 8473 | 1 | NA* | NA* | NA |

[1]Adhesion is graded 1-4, with 4 = excellent adhesion, and 1 = poor adhesion
*No gas barrier testing as EVOH layer adhesion very poor and cracked Table 1 shows that the resultant clear films of Examples 1 to 4 provided excellent adhesion of the EVOH polar polymer layer to the biaxially oriented polypropylene substrate. The tie-layer blends including EP copolymer and ethylene polar terpolymers significantly improved the adhesion of the EVOH layer to the substrate when compared to Comparative Examples 2 to 4 wherein no such tie-layer blend components were used. Examples 1 to 4 were at least equivalent to Comparative Example 1 which used maleic anhydride grafted polyolefin. Virtually no EVOH could be removed via the tape test in Examples 1-4, whereas nearly 100% of the EVOH was removed in Comparative Example 4. Moreover, the processability of the EP copolymer/ethylene polar terpolymer blends of the Examples was excellent with no bridging, sticking, or film breakage occurring.

Comparative Example 2, which uses a blend of EVOH as part of the tie-layer formulation to promote adhesion to the EVOH layer, improved adhesion to a certain degree during the casting and machine direction orientation portions of the film-making process. However, it showed only marginal adhesion between the EVOH and the polypropylene remained after transverse direction orientation. Similarly, the high ethylene content ethylene-propylene copolymer Lanxess Buna EP T2070P in Comparative Example 3 improved adhesion of the EVOH and polypropylene during casting and machine direction orientation; however, after transverse direction orientation, the adhesion between EVOH and polypropylene was only marginal. The relatively soft material of the BUNA EP T2070P would typically be expected to provide physical adhesion improvement but this was not found. Comparative Example 4, which used a conventional ethylene-propylene copolymer of lower ethylene content, showed very poor adhesion between the EVOH and polypropylene even during the casting and machine direction orientation processes. After transverse orientation, the EVOH layer cracked and peeled off. Thus, the adhesion improvement noted with these Comparative Examples was not adequate, and the adhesion was ultimately poor in the final films.

The gas barrier properties of the clear and metallized films were good and comparable to each other with the exception of Comparative Example 4 where the EVOH cracked and was easily removed. No gas barrier testing was done on this example as a result.

The results illustrate that the blends of ethylene-propylene copolymer and ethylene polar terpolymer provide good adhesion between EVOH and polypropylene biaxially oriented films as well as good processability. The adhesion strength provided by these tie-layer formulations is similar to that of anhydride-grafted polyolefin. Thus, this new family of resin blends can be used as tie-layers between polar materials like EVOH and polyolefin materials like polypropylene.

Test Methods

The various properties in the above examples were measured by the following methods:

Oxygen transmission rate of the film was measured by using a MOCON OXTRAN 2/20 unit substantially in accordance with ASTM D3985. In general, the preferred value was an average value equal to or less than 1 cc/100 in$^2$/day with a maximum of 3 cc/100 in$^2$/day.

Optical density was measured using a TOBIAS ASSOCIATES model TBX transmission densitometer. Optical density is defined as the amount of light reflected from the test specimen under specific conditions. Optical density is reported in terms of a logarithmic conversion. For example, a density of 0.00 indicates that 100% of the light falling on the sample is being reflected. A density of 1.00 indicates that 10% of the light is being reflected; 2.00 is equivalent to 1%, etc.

Polar skin adhesion was measured by adhering a strip of 1-inch wide 610 tape to the polar skin surface of a single sheet of film and removing the tape from the surface. The amount of polar skin removed was rated qualitatively as follows:

4=Excellent=0-10% polar skin removed
3=Good=11-30% polar skin removed.
2=Fair=31-50% metal removed
1=Poor =>50% polar skin removed In general, preferred values were Excellent to Good (4 to 3).

Appearance was rated qualitatively on the presence of cracks on the surface of the film.

The surface chemistry of the discharge-treated surface was measured using ESCA surface analysis techniques. A Physical Electronics model 5700LSCI X-Ray photoelectron/ESCA spectrometer was used to quantify the elements present on the sample surface. Analytical conditions used a monochromatic aluminum x-ray source with a source power of 350 watts, an exit angle of 50°, analysis region of 2.0 mm×0.8 mm, a charge correction of C—(C,H) in C 1 s spectra at 284.6 eV, and charge neutralization with electron flood gun. Quantitative elements such as O, C, and N were reported in atom %.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges. It is also to be understood that all numerical values and ranges set forth in this application are necessarily approximate.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A laminate film comprising:
a first polyolefin resin layer comprising 50-95 wt. % ethylene-propylene copolymer and 5-50 wt. % ethylene polar terpolymer, the ethylene polar terpolymer comprising,
an ethylene co-monomer,
a butyl acrylate co-monomer or a methyl acrylate co-monomer, and
a maleic anhydride co-monomer or a glycidyl methacrylate co-monomer; and
a layer comprising a polar polymer on one side of the first polyolefin resin layer.

2. The laminate film of claim 1, wherein the ethylene polar terpolymer comprises 25 wt. % or less butyl acrylate co-monomer and methyl acrylate co-monomer.

3. The laminate film of claim 1, wherein an ethylene content of the ethylene-propylene copolymer is 0.5 to 70 mole %.

4. The laminate film of claim 1, wherein the polar polymer is an ethylene vinyl alcohol, polyvinyl alcohol, amorphous nylon, polyetheramine or blends thereof.

5. The laminate film of claim 1, wherein the polar polymer comprises an ethylene vinyl alcohol and an ethylene content of the ethylene vinyl alcohol is at least 48 mole % ethylene.

6. The laminate film of claim 1, wherein the polar polymer comprises a polyetheramine comprising a copolymer of bisphenol A diglycidyl ether and at least 30 wt. % resorcinol diglycidyl ether with ethanolamine.

7. The laminate film of claim 1, further comprising a second polyolefin resin layer on the first polyolefin resin layer.

8. The laminate film of claim 7, wherein the second polyolefin resin layer comprises an isotactic propylene homopolymer.

9. The laminate film of claim 7, further comprising a third polyolefin resin layer on the second polyolefin resin layer opposite the side with the first polyolefin resin layer.

10. The laminate film of claim 9, wherein the third polyolefin resin layer comprises a heat-sealable polyolefin selected from the group consisting of propylene copolymers, terpolymers, polyethylene and combinations thereof.

11. The laminate film of claim 10, wherein the heat-sealable layer comprises an antiblock component selected from the group consisting of amorphous silicas, aluminosilicates, sodium calcium aluminum silicate, a crosslinked silicone polymer, and polymethylmethacrylate.

12. The laminate film of claim 9, wherein the third polyolefin resin layer is a winding layer comprising a crystalline polypropylene and an inorganic antiblocking agent.

13. The laminate film of claim 12, wherein the winding layer is a discharge treated winding layer.

14. The laminate film of claim 13, wherein the winding layer is laminated, coated with an adhesive or coated with an ink.

15. The laminate film of claim 12, wherein the winding layer comprises an antiblock component selected from the group consisting of amorphous silicas, aluminosilicates, sodium calcium aluminum silicate, a crosslinked silicone polymer, and polymethylmethacrylate.

16. The laminate film of claim 9, wherein the third polyolefin resin layer is a matte winding layer having a roughened surface and comprising a block copolymer blend of polypropylene and one or more other polymers, and wherein the third poly has a roughened surface.

17. The laminate film of claim 1, wherein the first polyolefin resin layer is a discharge-treated polyolefin resin layer.

18. The laminate film of claim 1, wherein the polar polymer resin layer is a discharge-treated polar polymer resin layer.

19. The laminate film of claim 18, wherein the discharge-treated polar polymer resin layer has a discharge-treated surface formed in an atmosphere of $CO_2$ and $N_2$.

20. The laminate film of claim 1, further comprising a vacuum deposited metal layer on the polar polymer resin layer.

21. The laminate film of claim 20, wherein the metal layer has a thickness of about 5 to 100 nm.

22. The laminate film of claim 20, wherein the metal layer has an optical density of about 1.5 to 5.0.

23. The laminate film of claim 20, wherein the metal layer comprises aluminum.

24. The laminate film of claim 1, wherein the laminate film is an extruded laminate film.

25. The laminate film of claim 1, wherein the film is for packaging a product.

26. The laminate film of claim 25, wherein the product is a food product.

* * * * *